(12) United States Patent
Sorimachi et al.

(10) Patent No.: US 8,026,444 B2
(45) Date of Patent: Sep. 27, 2011

(54) RADIATION-PROOF RESIN COMPOSITION AND RADIATION-PROOF CABLE

(75) Inventors: Masami Sorimachi, Hitachi (JP); Yoshiaki Nakamura, Hitachi (JP); Hitoshi Kimura, Hitachi (JP); Shigeki Matsuyama, Mito (JP)

(73) Assignee: Hitachi Cable, Ltd., Tokyo (JP)

(*) Notice: Subject to any disclaimer, the term of this patent is extended or adjusted under 35 U.S.C. 154(b) by 85 days.

(21) Appl. No.: 12/547,938

(22) Filed: Aug. 26, 2009

(65) Prior Publication Data

US 2010/0051316 A1 Mar. 4, 2010

(30) Foreign Application Priority Data

Aug. 28, 2008 (JP) ................. 2008-219723

(51) Int. Cl.
*H01B 3/30* (2006.01)
(52) U.S. Cl. .................................... 174/110 R
(58) Field of Classification Search .............. 174/110 R, 174/110 SR
See application file for complete search history.

(56) References Cited

U.S. PATENT DOCUMENTS

2007/0225437 A1* 9/2007 Morita et al. ............ 524/862

FOREIGN PATENT DOCUMENTS

| JP | 62-161850 (A) | 7/1987 |
| JP | 64-31850 (A) | 2/1989 |
| JP | 4-268351 (A) | 9/1992 |
| JP | 08-151490 | * 6/1996 |

* cited by examiner

*Primary Examiner* — Chau Nguyen
(74) *Attorney, Agent, or Firm* — Foley & Lardner LLP

(57) ABSTRACT

A radiation-proof resin composition includes a polymer containing chlorine, a radiation resistance providing agent for providing the polymer with a radiation resistance, an amorphous inorganic material for capturing an ionic component generated in the polymer by radiation application, and a reinforcing material for reinforcing a mechanical strength of the polymer. An amount of the reinforcing material is not more than that of the amorphous inorganic material.

5 Claims, 4 Drawing Sheets

RADIATION-PROOF RESIN COMPOSITION AND RADIATION-PROOF CABLE

The present application is based on Japanese patent application No. 2008-219723 filed Aug. 28, 2008, the entire contents of which are incorporated herein by reference.

BACKGROUND OF THE INVENTION

1. Field of the Invention

The present invention relates to a radiation-proof resin composition and a radiation-proof cable. In particular, it relates to a radiation-proof resin composition and a radiation-proof cable, which are excellent in water-resistant property.

2. Description of the Related Art

Electric wires and cables used in nuclear power stations, such as boiling water reactors (BWRs), or pressurized water reactors (PWRs), are exposed to heat and radiations during normal running of each nuclear reactor operated in specified running conditions, and also in the event of loss-of-coolant accidents, fires etc. Accordingly, in case of these accidents, electric wires and cables used in the nuclear power stations are required to have high flame retardancy and radiation resistance.

Used as conventional electric wire and cable sheath materials are a polymer material containing chlorine such as polychloroprene rubber (CR), chlorosulfonated polyethylene (CSM), chlorinated polyethylene (CM) etc. so as to provide heat resistance, radiation resistance and flame retardancy while retaining the mechanical property. The CR sheath materials are used mainly for BWRs (heat resistance required: 121° C.×7 days, radiation resistance required: 760 kGy), the CSM sheath materials are used mainly for PWRs (heat resistance required: 140° C.×9 days, radiation resistance required: 2 MGy). Here, when a polymer compound material containing a halogen such as chlorine is exposed to heat and radiations, the halogen is likely to desorb from the material. In this case, the material includes an ionic component containing the halogen.

JP-A-S62-161850 discloses a flame-retardant composition that is composed of vinyl chloride graftmer and 10 to 70 parts by wt of at least one of calcium carbonate and magnesium chloride to 100 parts by wt of the vinyl chloride graftmer, 3 to 50 parts by wt of at least one of baked clay and baked silica, and a flame retarder, and exhibits an oxygen index of 27 or more.

The flame-retardant composition in JP-A-S62-161850 thus composed is excellent in arc spark resistance so that it can be used as a covering material for substrate wiring of various devices.

Also, because as an evaluation method for cable covering materials, it is difficult to simultaneously apply heat and radiations to the cable covering materials because of requiring a special apparatus, the evaluation method uses sequential ageing (irradiation after thermal ageing). Also, there is considered reversed sequential ageing (thermal ageing after irradiation).

If the flame-retardant composition including halogen is exposed to heated water and radiation when assumed loss-of-coolant accidents occur, the ionic component occurred by the halogen desorption reaction absorbs the heated water to be swollen. The flame-retardant composition as disclosed in JP-A-S62-161850 is not intended for use in which radiation resistance is required, and it therefore cannot be used directly as a BWR sheath material or a PWR sheath material. Namely, when a cable using the flame-retardant composition as disclosed in JP-A-S62-161850 as the sheath material is exposed to heated water, heat and radiations, the ionic component occurred in the sheath material may not be captured such that it absorbs water and be swollen to lower the mechanical strength of the sheath material. In this case, the sheath material may be peeled off from the cable.

SUMMARY OF THE INVENTION

Accordingly, it is an object of the present invention to provide a radiation-proof resin composition that can be used as BWR and PWR sheath materials, is excellent in flame retardancy, heat resistance, radiation resistance and water-resistant property and can pass the test of the reversed sequential method, as well as a radiation-proof cable.

(1) According to one embodiment of the invention, a radiation-proof resin composition comprises:

a polymer comprising chlorine;

a radiation resistance providing agent for providing the polymer with a radiation resistance;

an amorphous inorganic material for capturing an ionic component generated in the polymer by radiation application; and a reinforcing material for reinforcing a mechanical strength of the polymer, an amount of the reinforcing material being not more than that of the amorphous inorganic material.

In the above embodiment (1), the following modifications and changes can be made.

(i) The amorphous inorganic material comprises a baked clay not more than 2.0 μm in an average gain size, the reinforcing material comprises a carbon black not more than 200 nm in an average gain size, and the amorphous inorganic material and the reinforcing material are added to 100 parts by weight of the polymer at a total amount not less than 40 parts and not more than 120 parts by weight.

(ii) The reinforcing material is added to the polymer at a rate of not less than a fifth and not more than one relative to a unit amount of the amorphous inorganic material.

(iii) The radiation resistance providing agent comprises an antioxidant and a processing aid, the antioxidant is added to 100 parts by weight of the polymer at an amount not less than 2 parts by weight, and the processing aid is added to 100 parts by weight of the polymer at an amount not less than 5 parts and not more than 40 parts by weight.

(iv) The polymer comprises at least one halogen-based polymer selected from polychloroprene, chlorinated polyethylene and chlorosulfonated polyethylene.

(2) According to another embodiment of the invention, a radiation-proof cable comprises:

a conductor with an insulation formed thereon; and the radiation-proof resin composition according to the embodiment (1), the radiation-proof resin composition being on a periphery of the conductor.

(3) According to another embodiment of the invention, a radiation-proof cable comprises:

a plurality of conductors with an insulation formed thereon, the conductors being stranded to form a stranded wire; and the radiation-proof resin composition according to the embodiment (1), the radiation-proof resin composition being on a periphery of the stranded wire.

Points of the Invention

A radiation-proof resin composition in one embodiment of the invention is composed such that a carbon black and a baked clay with a predetermined grain size are added at a predetermined rate to a halogen-based polymer. Therefore, even when an ionic component is caused by radiation application and thermal deterioration, the baked clay can efficiently capture the ionic component and the carbon black can suppress the radiation-proof resin composition from being swollen due to water penetration into the radiation-proof resin composition.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Figure 1:
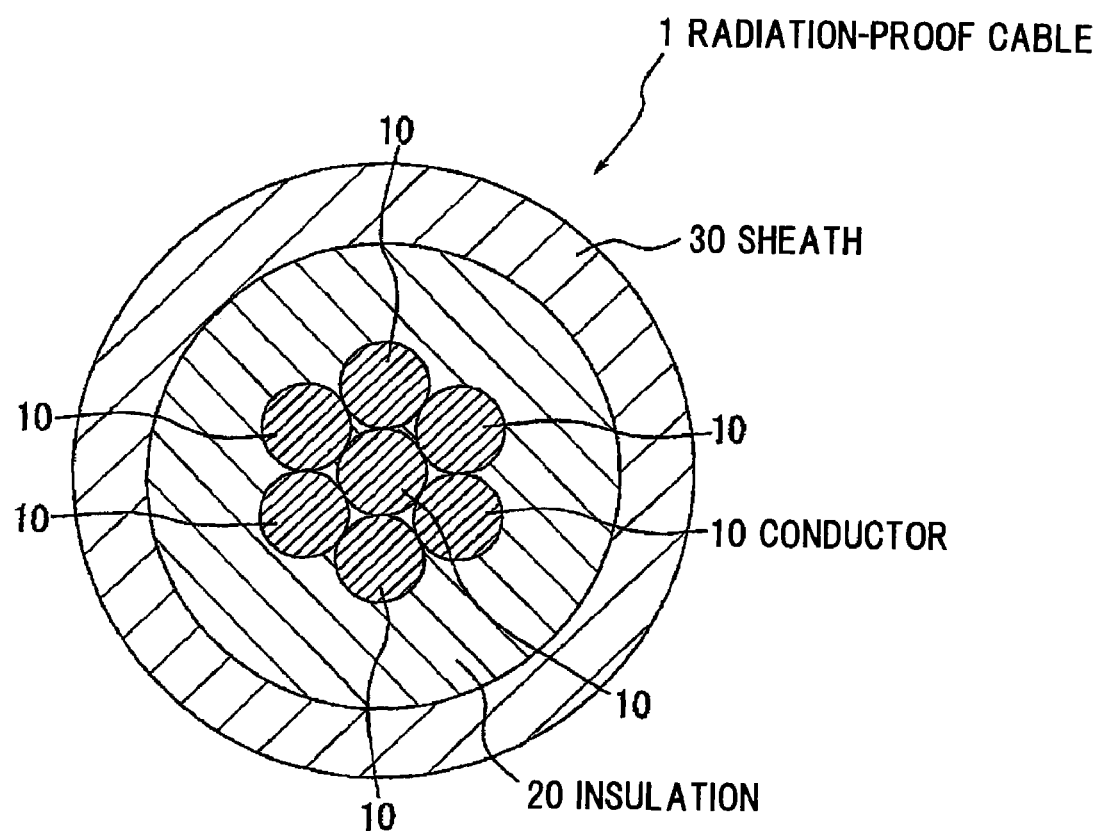
FIG. 1 is a cross sectional view showing a radiation-proof cable using a radiation-proof resin composition in a preferred first embodiment according to the invention.

FIG. 1 is a cross sectional view showing a radiation-proof cable using a radiation-proof resin composition in a preferred first embodiment according to the invention A radiation-proof resin composition in the first embodiment of the invention comprises a halogen-based polymer as a polymer containing chlorine, a radiation resistance providing agent for providing the halogen-based polymer with radiation resistance, an amorphous inorganic material for capturing an ionic component occurred in the halogen-based polymer by irradiation of radiations, and a reinforcing material having an insulation property, reinforcing the mechanical strength of the halogen-based polymer, and added to the halogen-based polymer not more than the additive amount of the amorphous inorganic material. The radiation-proof resin composition of the first embodiment may be formed by further adding a specified combination preparation.

A radiation-proof cable 1 of the embodiment comprises plural conductors 10, an insulation 20 formed on the periphery of the plural conductors 10, and a sheath 30 formed of the radiation-proof resin composition of the embodiment for covering the conductor 10 from outside of the insulation 20. The sheath 30 is formed by extruding a material to compose the sheath 30 on the periphery of the insulation 20 to cover the insulation 20. The plural conductors 10 are each formed from a metal material such as copper or copper alloy with a predetermined diameter. The radiation-proof cable 1 of the embodiment is produced by extruding a material to compose the insulation 20 on the surface of the conductor 10 to form the insulation 20.

Halogen-Based Polymer

In this embodiment, the halogen-based polymer (chlorine-based polymer) may be a polymer compound containing chlorine such as polychloroprene, chlorosulfonated polyethylene or chlorinated polyethylene.

Polychloroprene may be, e.g., a dry type (solid form) polychloroprene. Polychloroprene is generally classified into a sulfur-modified type and a non-sulfur-modified type with reference to molecular weight, uniformity and the kind of stability adjusting agent in the polymerization. The sulfur-modified type polychloroprene may be a halogen-based polymer that sulfur or a sulfur compound such as thiuram disulfide is incorporated in the polymer structure. The non-sulfur-modified type polychloroprene may be a mercaptan-modified polychloroprene.

Polychloroprene has a property that when it is left at low temperature, it loses the elasticity and increases in rigidity. This is because segments of polychloroprene are arranged regularly in a predetermined direction to form a crystal structure, and this phenomenon is called crystallization of polymer. Polychloroprene is classified into many types with reference to easiness of crystallization. The order of difficult-to-crystallize polychloroprene to easy-to-crystallize polychloroprene is as follows (Names below are all product names of neoprene (registered trademark) from Dupont Performance Elastomers and the radiation-proof resin composition in the embodiment may be any of the polychloroprenes below):

GRT, WD, WRT, WXJ, WK<GN, GS, GNA, WB, WX<W, WM-1, WHV<HC, AD, AG, CG

Chlorosulfonated polyethylene is produced such that polyethylene as a raw material is dissolved in a predetermined solvent (e.g., organic solvent such as toluene, xylene or tetrahydrofuran) and the dissolved polyethylene is then chlorinated or chlorosulfonated. Chlorosulfonated polyethylene does not have any double bond in the main chain as a basic skeleton. Therefore, chlorosulfonated polyethylene is excellent in ozone resistance and exhibits the insulation property.

Chlorosulfonated polyethylene can be cross-linked. For example, it can be cross-linked by using peroxide, acid acceptor/sulfur containing promoter, or maleimide/cross linker+acid acceptor etc. There are various grades of chlorosulfonated polyethylenes with chlorine content of about 29% to 43%. In this embodiment, chlorosulfonated polyethylenes with any chlorine content can be used.

Chlorinated polyethylene is produced as follows. First, linear polyethylene powder is prepared. The linear polyethylene contains low-density polyethylene (e.g., on the order of 910 kg/m$^3$ to 930 kg/m$^3$) to high-density polyethylene (e.g., on the order of 930 kg/m$^3$ to 970 kg/m$^3$). Subsequently, the linear polyethylene powder is suspended and dispersed in water into an aqueous suspension. Subsequently, at a temperature around a melting point of polyethylene crystal as a raw material, chlorine gas is blown into the aqueous suspension. This results in the chlorinated polyethylene in the first embodiment.

Because of the heterogeneous chemical reaction of chlorine gas and polyethylene by blowing the chlorine gas into the aqueous suspension, the resultant chlorinated polyethylene is formed as a thermoplastic elastomer containing amorphous rubber-like chlorinated polyethylene, and semicrystalline and crystalline plastic chlorinated polyethylene. The chlorination degree of chlorinated polyethylene used in the first embodiment can be 25% to 45%. Here, in the case of using a rubber elastic chlorinated polyethylene, it is preferable that the chlorination degree of chlorinated polyethylene to be used is 30% to 40% therefor.

As compared to CR and CSM as other halogen-based polymers, chlorinated polyethylene has no double bond in the molecular chains, and is random in distributions of chlorine atoms in the molecular chains, i.e., chloro groups as side chain groups, and thermally stable, excellent in weather resistance, and high in flame retardancy, because of high molecular weight.

Radiation Resistance Providing Agent

The radiation resistance providing agent for providing the halogen-based polymer of the first embodiment with radiation resistance may be an antioxidant and a processing aid.

Antioxidant

Antioxidant provides the radiation-proof resin composition with a function to retain heat resistance and a function to activate radiation resistance. The antioxidant may include a phenol- or amine-based primary antioxidant. Also, the antioxidant may include a sulfur- or phosphorus-based secondary antioxidant. Specifically, the antioxidant in the first embodiment uses the amine-based primary antioxidant. Alternatively, the antioxidant in the first embodiment may use both the amine-based primary antioxidant and the other antioxidant such as the phosphorus-based secondary antioxidant.

For providing the radiation-proof resin composition with radiation resistance, 2 or more parts by wt of antioxidant is added to 100 parts by wt of the halogen-based polymer. In consideration of the saturation of the radiation resistance effect and the cost problem, it is preferable that the additive amount of the antioxidant is set in the range of up to about 15 parts by wt to 100 parts by wt of halogen-based polymer.

The phenol-based primary antioxidant is classified into mono-, bis-, and poly-phenol-based primary antioxidants with reference to the number of hydroxyl groups (—OH groups) existing in the molecule.

The mono-phenol-based primary antioxidant may be 2,6'-di-ter-butyl-4-methylphenol, 2,6-di-ter-butyl-4-ethylphenol, or mono($\alpha$-methylbenzyl)phenol etc. The bis-phenol-based primary antioxidant may be 2,2'-methylene-bis(4-methyl-6-ter-butylphenol), 2,2'-methylene-bis(4-ethyl-6-ter-butylphenol), 4,4'-butyliden-bis(3-methyl-6-ter-butylphenol), 4,4'-thiobis(3-methyl-6-ter-butylphenol), or di($\alpha$-methylbenzyl) phenol etc. The poly-phenol-based primary antioxidant may be 2,5'-di-ter-butylhydroquinone, 2,5'-di-ter-amylhydroquinone, tri($\alpha$-methylbenzyl)phenol, p-cresol, or dicyclopentadiene etc.

The amine-based antioxidant may be a quinoline-based antioxidant, and an aromatic secondary amine-based antioxidant. The quinoline-based antioxidant may be 2,2,4-trimethyl-1,2-dihydroquinoline, or 6-ethoxy-1,2-dihydro-2,2,4-trimethylquinoline etc. The aromatic secondary amine-based antioxidant may be phenyl-1-naphthylamine, alkylated diphenylamine, octylated diphenylamine, 4,4'-bis($\alpha,\alpha$-dimethylbenzyl)dienylamine, p-(p-toluenesulfonylamide)diphenylamine, N,N'-di-2-naphtyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, or N-phenyl-N'-(3-methacryloyloxy-2-hydroxypropyl)-p-phenylenediamine etc.

The sulfur-based secondary antioxidant is classified into benzimidazole-, dithiocarbamate-, and thiourea-based secondary antioxidants. The benzimidazole-based secondary antioxidant may be 2-mercaptobenzimidazole, 2-mercaptomethylbenzimidazole, or 2-mercaptobenzimidazole zinc salt etc. The dithiocarbamate-based secondary antioxidant may be nickel diethyldithiocarbamate, or nickel dibutyldithiocarbamate etc. The thiourea-based secondary antioxidant may be 1,3-bis(dimethylaminopropyl)-2-thiourea, or tributylthiourea etc.

The phosphorus-based secondary antioxidant may be tris (nonylphenyl)phosphite etc. as a phosphite-based secondary antioxidant.

Processing Aid

The processing aid in the first embodiment provides a processing stabilization function during blending or extrusion of the radiation-proof resin composition, and a radiation resistance providing agent (antirad) function for providing the radiation-proof resin composition with radiation resistance. The processing aid may be petroleum-based oil (i.e., process oil), or aromatic ring (benzene ring)-containing ester-based plasticizer etc.

The process oil may be paraffin-, aromatic-, or naphthene-based oil added to rubber materials etc. The ester-based plasticizer may be a plasticizer having an aromatic ring in its molecule, e.g., dioctyl phthalate (DOP), diisononyl phthalate (DINP), diisodecyl phthalate (DIDP), or trioctyl trimellitate (TOTM) added to polyvinyl chloride etc.

Here, compounds containing numerous benzene ring compounds are excellent in radiation resistance, and are therefore preferably used as the processing aid in the first embodiment. For example, aromatic-based oil can be used as the processing aid. The processing aid may be any one of the process oil or ester-based plasticizer alone, or a mixture of plural compounds selected from the process oil and/or ester-based plasticizer.

To ensure workability and provide the radiation-proof resin composition with the antirad effect, the processing aid amount added is not less than 10 parts by wt to 100 parts by wt of halogen-based polymer. If the additive amount of the processing aid amount exceeds 50 parts by wt to 100 parts by wt of halogen-based polymer, it may cause bleed, deterioration of mechanical properties, and saturation of the antirad effect. Thus, the processing aid is added preferably not less than 10 parts by wt and not more than 50 parts by wt to 100 parts by wt of halogen-based polymer.

Providing the Radiation-Proof Resin Composition with Water-Resistant Property

In evaluating a cable covering material, the evaluation result is obtained such that the evaluation of the cable covering material by the reversed sequential ageing evaluation is lower than that by the sequential ageing evaluation. In other words, the evaluation result of the cable covering material (e.g., a sheath material formed of CR, a sheath material formed of CSM etc.) by the reversed sequential ageing evaluation is remarkably lower than that by the sequential ageing evaluation. As the result of considerations of the inventors, the reason for the above is estimated as below.

That is, the reversed sequential ageing evaluation of CR and CSM sheath materials performs thermal aging after radiation ($\gamma$-ray) application to the sheath materials. Consequently, radicals produced in the sheath materials by radiation application actively migrate due to heat applied to the sheath materials in subsequent thermal aging, to accelerate dechlorination due to the radicals. The inventors have found that, due to the dechlorination (or dehalogenation), a lot of ionic components are generated from the sheath material to lower the water-resistant property of the sheath material.

Based on the above finding, the inventors have demonstrated that an excellent water-resistant property under the radiation environment can be provided with the radiation-proof resin composition by adding at a predetermined amount a specific amorphous inorganic material and a specific reinforcing material to a halogen-based polymer for composing the radiation-proof resin composition. For example, an amorphous inorganic material and a reinforcing material as described below are added to the halogen-based polymer.

Amorphous Inorganic Material

The amorphous inorganic material captures the ionic component generated in the halogen-based polymer due to the dechlorination caused by radiation application. For example, the amorphous inorganic material may be baked clay. The baked clay is an inorganic material with hydrous aluminum silicate as a main component and is produced by baking clay at predetermined temperature (e.g., 600° C. to 800° C.). During baking the clay, crystal water included in the clay is discharged and the crystal structure collapses (i.e., becoming amorphous) such that the baked clay can be enhanced in activity to have ionic component capturing effect. When the clay is baked to discharge the crystal water included, it creates a lot of pores (i.e., regions with crystal water will pores or voids) in the clay such that it becomes porous. The pores allow ionic components and smell components etc. with a smaller size than the pore size to be captured therein. In this embodiment, "enhanced in activity" means that the clay becomes porous such that the ionic component etc. can be captured therein. In this embodiment, even when the ionic component is generated numerously due to the dechlorination during the reversed sequential test, the ionic component can be effectively captured such that the radiation-proof resin composition can have an excellent water-resistant property. In order to have an excellent ionic component capturing effect, it is preferred that the baked clay has an average crystal grain size (measured by light scattering or diffraction method) of not more than 2.0 μm.

The baked clay may be SANTITONE-W, SP33, WHITE-TEX No. 5 (all from Engelhard Minerals), Polyfil-70, Polyfil-80 (all from J. M. Huber) etc. Alternatively, a surface-treated baked clay in which specific surface treatment is conducted on the surface of the baked clay may be used. For example, it may be TRANSLINK-37 (surface-treated with vinylsilane), TRANSLINK-77 (surface-treated with vinylsilane), TRANSLINK-445 (surface-treated with aminosilane), ATTACGEL-36, ATTAGEL-40, ATTAGEL-50 (all from Engelhard Minerals), Nulok-321 (surface-treated with aminosilane), Nulok-390 (surface-treated with aminosilane), Nucap-100 (surface-treated with mercaptosilane), Nucap-190 (surface-treated with mercaptosilane), Nucap-200 (surface-treated with mercaptosilane) (all from J. M. Huber) etc.

Reinforcing Material

The reinforcing material has an insulation property and a function to reinforce the mechanical strength of halogen-based polymer. In this embodiment, the reinforcing material may be carbon black. Carbon blacks can be classified with reference to the production method thereof. For example, they are classified into a channel type, a furnace type, an acetylene type, and a thermal type carbon black. The insulative carbon black used in the embodiment may be the furnace type and the thermal type carbon blacks. In this embodiment, a carbon black with an average grain size (measured by electron microscopy) of not more than 200 nm can be used such that it has excellent reinforcing effect, can prevent the radiation-proof resin composition from being swollen by water penetration, and provides the radiation-proof resin composition with sufficient water-resistant property.

The furnace type carbon black may be SAF, SAF-HS, ISAF, N-339, ISAF-LS, HAF, HAF-FS, N-351, HAF-LS, N-375, MAF, FEF, FEF-HS, SRF, SRF-LM, SRF-LS, GPF, or ECF etc. The thermal type carbon black may be FT, or MT etc. The furnace type or thermal type carbon black can be solely used for the reinforcing material. Alternatively, the reinforcing material may be prepared by mixing at least two kinds of carbon blacks selected from the furnace type and the thermal type carbon blacks.

Additive Amount of Amorphous Inorganic Material and Reinforcing Material

The additive amount of the carbon black as the reinforcing material and the baked clay as the amorphous inorganic material to the halogen-based polymer is preferably not less than 40 parts by wt and not more than 120 parts by wt (in the total of the carbon black and the baked clay) relative to 100 parts by wt of the halogen-based polymer. The carbon black is preferably added not less than ⅕ and not more than 1 to the unit amount of the baked clay.

Thus, the carbon black not less than ⅕ to the unit amount of the baked clay is added to the halogen-based polymer such that the halogen-based polymer can have a rubber elasticity suited for extrusion molding to provide the sheath material formed of the radiation-proof resin composition with a smooth appearance. On the other hand, the carbon black not more than 1 to the unit amount of the baked clay is added to the halogen-based polymer such that the sheath material formed of the radiation-proof resin composition can retain the mechanical property, and that the radiation-proof resin composition is adjusted in the viscosity range that it has no trouble during processing. Further, it is supposed that, by setting the rate of the carbon black added to the baked clay to be not less than ⅕ and not more than 1, the water-resistant property of the radiation-proof resin composition can be effectively attained by the addition of the carbon black. In addition, the carbon black can suitably lower the rubber elasticity of the halogen-based polymer, and contribute to enhancement in processability and enhancement in mechanical property of the radiation-proof resin composition.

As described above, the baked clay as an amorphous inorganic material can capture the ionic component and the carbon black as a reinforcing material can prevent the radiation-proof resin composition from being swollen due to water penetration into the radiation-proof resin composition. Thereby, the excellent water-resistant property can be brought to the radiation-proof resin composition. Thus, by adding at the above predetermined rate the baked clay and the carbon black to the halogen-based polymer, the excellent water-resistant property can be attained under the radiation environment.

Flame Retardant

Although the halogen-based polymer of the embodiment can have flame retardancy due to the inclusion of halogen, the flame retardancy can be further enhanced by adding a flame retardant. The flame retardant can use inorganic or organic flame retardant. The inorganic flame retardant can use antimony trioxide, magnesium hydroxide, aluminum hydroxide, zinc borate, or phosphorus-based compounds. Also, the organic flame retardant can use halogen-based organic flame retardants, such as chlorine-, bromine-based organic flame retardants.

The flame retardant can use any one of the inorganic or organic flame retardant alone, or a mixture of plural flame retardants selected from the inorganic and/or organic flame retardant. The flame retardant is added to the halogen-based polymer in a range of exhibiting the flame retardant effect, no saturation of the flame retardant effect, and no deterioration of mechanical properties. Specifically, the flame retardant is added not less than 2 parts by wt and not more than 30 parts by wt to 100 parts by wt of the halogen-based polymer.

Cross-Linking Method of Halogen-Based Polymer

A suitable cross-linking method can be used according to the kind of polymer. For example, when polychloroprene is used as the halogen-based polymer, a metal oxide can be used as the cross-linker. The metal oxide may be magnesia, zinc oxide, lead oxide, read lead, hydrotalcite etc. A specific promoter may be used together with the metal oxide. In order to provide the radiation-proof resin composition with the water-resistant property, the specific promoter is preferably used together with lead oxide, red lead or litharge or hydrotalcite etc. as the metal oxide.

When chlorosulfonated polyethylene is used as the halogen-based polymer, a metal oxide as used in polychloroprene can be also used as the cross-linker. In order to provide the radiation-proof resin composition with the water-resistant property, the specific promoter is preferably used together with lead oxide, read lead or litharge or hydrotalcite etc. as the metal oxide. For the cross-linking of chlorosulfonated polyethylene, peroxide cross-linking can be used to further enhance the water-resistant property.

In case of conducting the peroxide cross-linking reaction, a cross linker is desirably used together which has a function to suppress the polymer radical breaking occurred in the cross-linking reaction to enhance the cross-linking efficiency.

The cross linker may be a polyfunctional monomer such as triallyl cyanurate (TAC), triallyl isocyanurate (TAIC), or trimethylolpropane triacrylate (TMPT) etc.

When chlorinated polyethylene is used as the halogen-based polymer, thioureas, amines or peroxide can be used as the cross-linker. In case of cross-linking the chlorinated polyethylene, the peroxide cross-linking is preferably conducted from the point of view of preservation, tensile strength, and heat resistance. When conducting the peroxide cross-linking, the above cross linker is preferably used together.

Other Combination Preparations

As further combination preparations, it is possible to use a lubricant, filler, colorant etc., for example, used in rubber material synthesis. Normal methods can be employed in the cross-linking of the halogen-based polymer, the physical mixing of the specified combination preparations into the halogen-based polymer, and the extrusion molding of the sheath material formed of the radiation-proof resin composition to form a specified shape.

Advantages of the First Embodiment

The radiation-proof resin composition in the first embodiment of the invention is composed such that the carbon black and the baked clay with a predetermined grain size are added at a predetermined rate to the halogen-based polymer. Therefore, even when the ionic component is caused by radiation application and thermal deterioration, the baked clay can efficiently capture the ionic component and the carbon black can suppress the radiation-proof resin composition from being swollen due to water penetration into the radiation-proof resin composition. Thus, the radiation-proof resin composition of the embodiment can be used as BWR and PWR cable sheath materials, is excellent in flame retardancy, radiation resistance and water-resistant property, and can pass the reversed sequential test. Also, the radiation-proof resin composition of the embodiment can apply to a sheath material using the same and the radiation-proof cable 1 using the sheath material.

In other words, the radiation-proof resin composition of the embodiment can exhibit the water-resistant property as well as the radiation resistance by the baked clay and the carbon black existing in the halogen-based polymer even under the radiation application and thermal deterioration. Therefore, the radiation-proof cable 1 using the sheath material formed of the radiation-proof resin composition of the embodiment can prevent from the sheath material from peeling off from the conductor 10 even when it is exposed to hot water and radiations in a nuclear reactor etc. Thus, the sheath material can sufficiently function as a sheath.

Second Embodiment

Figure 2:
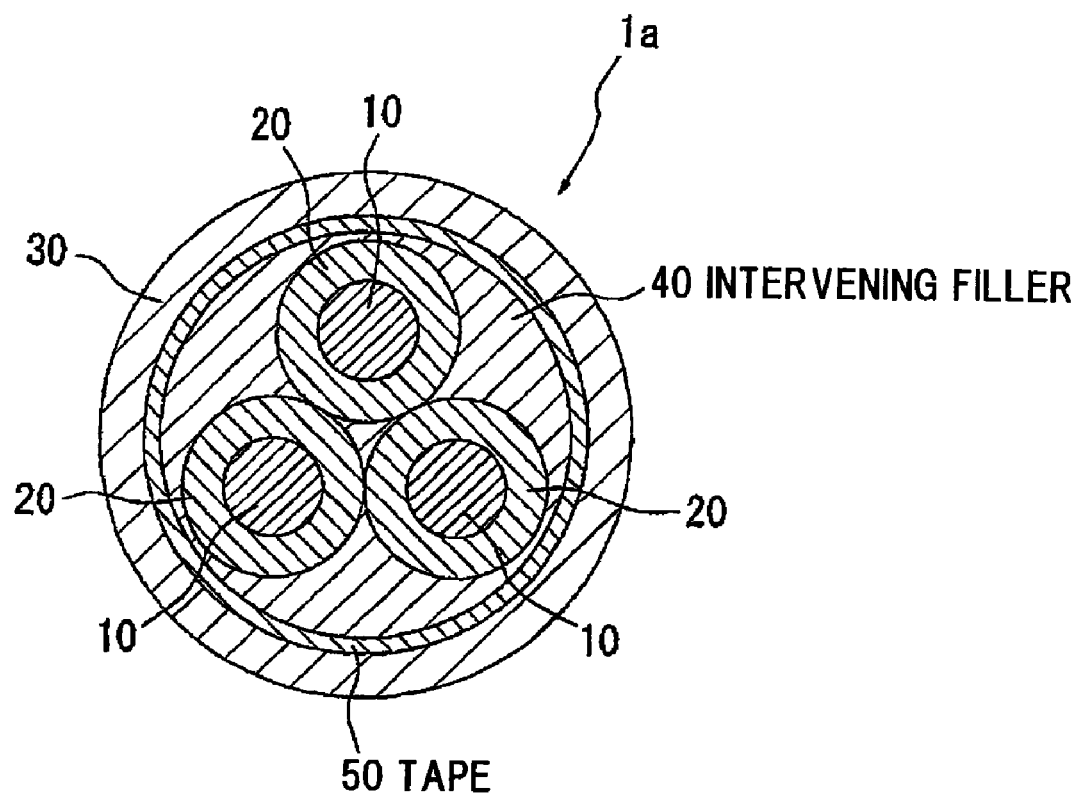
FIG. 2 is a cross sectional view showing a radiation-proof cable in a preferred second embodiment according to the invention.

FIG. 2 is a schematic cross-sectional view showing a radiation-proof cable in the second embodiment according to the invention.

The radiation-proof cable 1a of the second embodiment is different from the radiation-proof cable 1 of the first embodiment in that the plural conductors 10 are each covered with an insulation 20, an intervening filler 40 is formed thereon, and a tape 50 is wound on the intervening filler 40, and the other components thereof are the same as those of the radiation-proof cable 1. The detailed explanation except about the difference will be omitted below.

The radiation-proof cable 1a comprises a three-wire core with plural conductors 10 (e.g., three conductors) with the insulation 20 formed on the periphery thereof, the intervening filler 40 formed on the three-wire core, the tape 50 as a press-holding tape wound on the periphery of the intervening filler 40, and a sheath 30 covering the tape 50. In the second embodiment, the sheath 30 is formed of the radiation-proof resin composition as used in the first embodiment.

Third Embodiment

Figure 3:
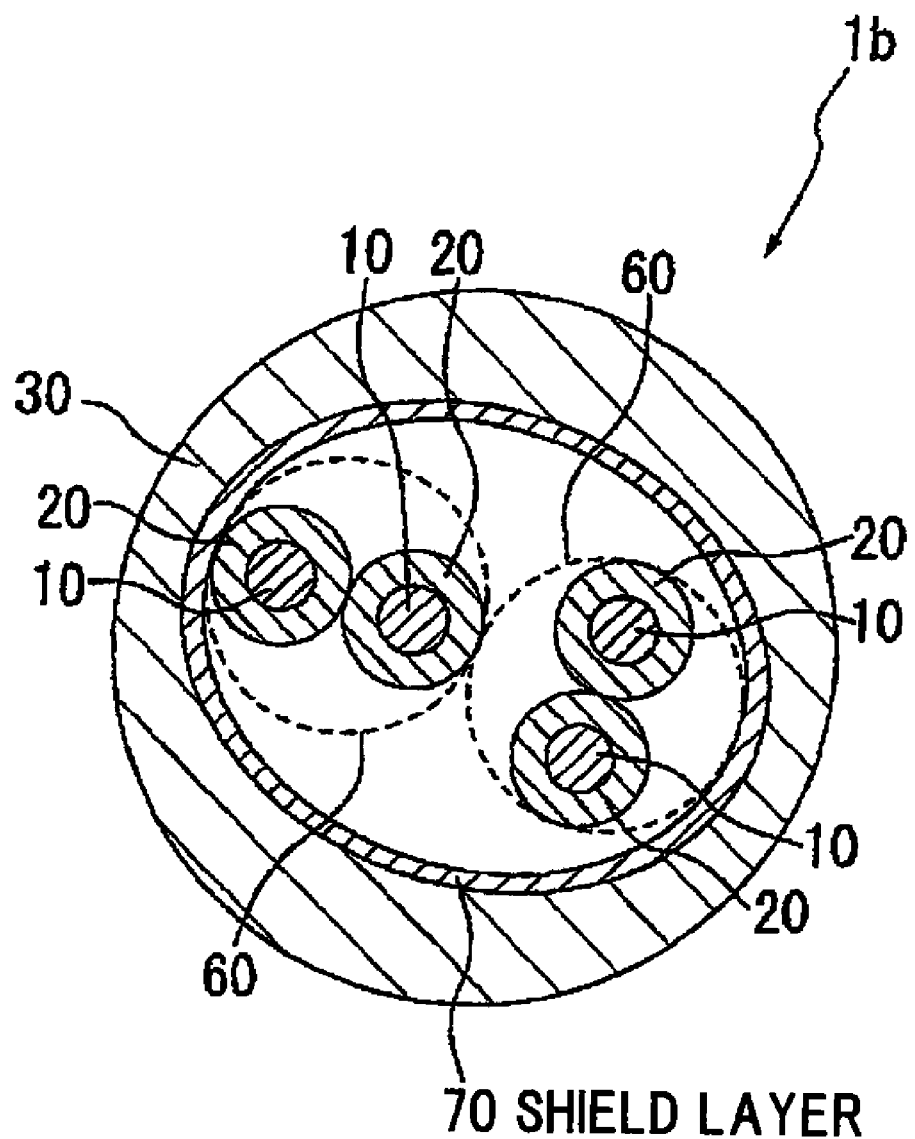
FIG. 3 is a cross sectional view showing a radiation-proof cable in a preferred third embodiment according to the invention.

FIG. 3 is a schematic cross-sectional view showing a radiation-proof cable in the third embodiment according to the invention.

The radiation-proof cable 1b of the third embodiment is different from the radiation-proof cable 1a of the second embodiment in that it comprises a twisted pair wire 60 in which a conductor 10 covered with an insulation 20 is twisted, and the other components thereof are the same as those of the radiation-proof cable 1. The detailed explanation except about the difference will be omitted below.

The radiation-proof cable 1b comprises a first wire core and a second wire core with plural conductors 10 (e.g., two conductors) with the insulation 20 formed on the periphery thereof, twisted pair wires 60 with the first and second wire cores twisted, a shield layer 70 formed of a metal material and covering the twisted pair wires 60, and a sheath 30 covering the shield layer 70. In the third embodiment, the sheath 30 is formed of the radiation-proof resin composition as used in the first embodiment.

Fourth Embodiment

Figure 4:
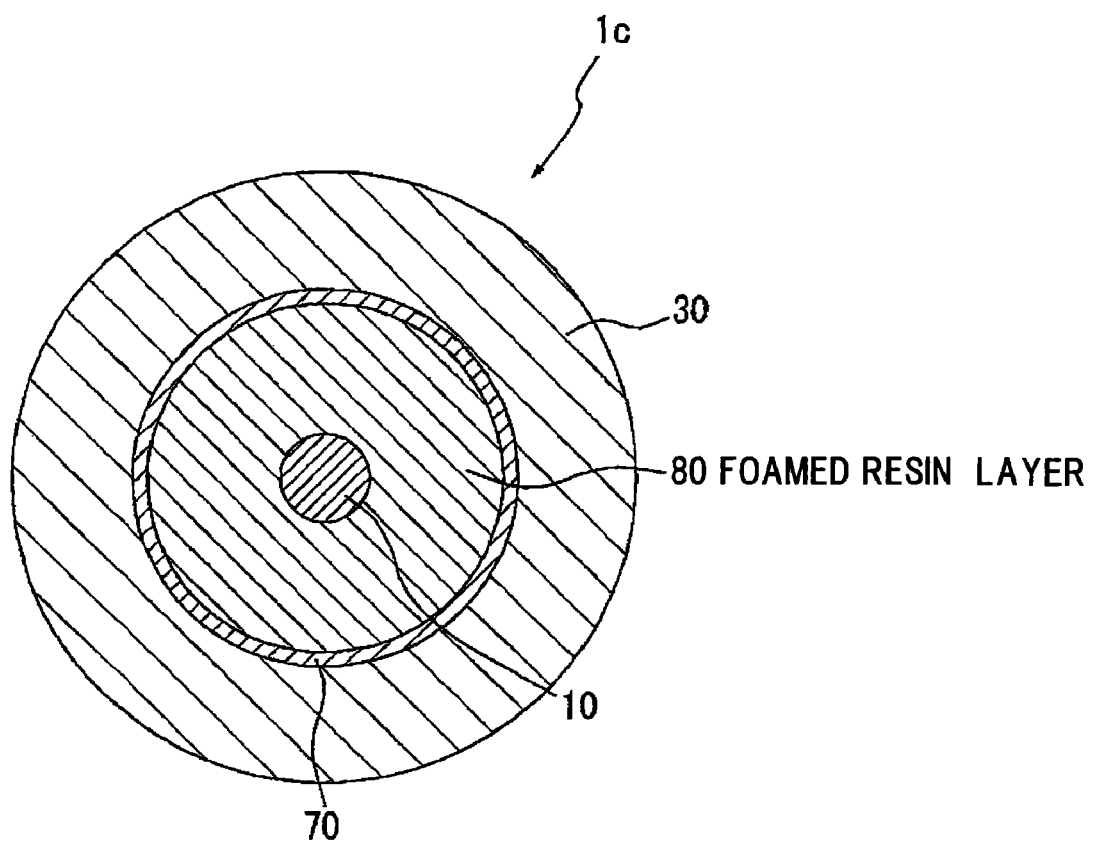
FIG. 4 is a cross sectional view showing a radiation-proof cable in a preferred fourth embodiment according to the invention.

FIG. 4 is a schematic cross-sectional view showing a radiation-proof cable in the fourth embodiment according to the invention.

The radiation-proof cable 1c of the fourth embodiment is different from the radiation-proof cable 1 of the first embodiment in that a conductor 10 is covered with a foamed resin layer 80, the foamed resin layer 80 is covered with a shield layer 70, and the shield layer 70 is covered with a sheath 30, and the other components thereof are the same as those of the radiation-proof cable 1. The detailed explanation except about the difference will be omitted below.

The radiation-proof cable 1c comprises the conductor 10, the foamed resin layer 80 formed of a foamed resin and covering the conductor 10, the shield layer 70 formed of a metal material and covering the foamed resin layer 80, and the sheath 30 covering the shield layer 70. In the fourth embodiment, the sheath 30 is formed of the radiation-proof resin composition as used in the first embodiment.

EXAMPLES

Table 1 shows combination of compounds for forming the insulation 20 (formed of the radiation-proof resin composition) in Examples of the present invention, and combination of compounds for forming an insulation in Comparative Examples.

TABLE 1

| Combination | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|---|
| Polychloroprene | 100 | 100 | 100 | 100 | — | — | 50 | 100 | 100 | 100 | 100 | — | — | 100 | 100 |
| Chlorosulfonated polyethylene | — | — | — | — | 100 | — | — | — | — | — | — | 100 | 100 | — | — |
| Chlorinated polyethylene | — | — | — | — | — | 100 | 50 | — | — | — | — | — | — | — | — |
| DCP | — | — | — | — | — | 3 | — | — | — | — | — | — | — | — | — |
| TAIC | — | — | — | — | — | 1.5 | — | — | — | — | — | — | — | — | — |
| Red lead ($Pb_3O_4$) | 30 | 30 | 30 | 30 | 30 | — | 30 | 30 | 30 | 30 | 30 | 30 | 30 | 30 | 30 |
| Sulfur | 0.5 | 0.5 | 0.5 | 0.5 | — | — | 0.5 | 0.5 | 0.5 | 0.5 | 0.5 | — | — | 0.5 | 0.5 |
| Accelerant TS | 1 | 1 | 1 | 1 | — | — | 1 | 1 | 1 | 1 | 1 | — | — | 1 | 1 |
| Accelerant TRA | — | — | — | — | 1 | — | — | — | — | — | — | 1 | 1 | — | — |
| Accelerant DM | — | — | — | — | 2 | — | — | — | — | — | — | 2 | 2 | — | — |
| Aromatic based oil | 5 | 10 | 10 | 10 | 40 | 20 | 20 | 2 | 60 | 10 | 7 | 20 | 10 | 10 | 10 |
| Amine based antioxidant | 2 | 5 | 5 | 10 | 5 | 5 | 5 | 5 | 5 | 5 | — | 5 | 5 | 5 | 5 |
| Stearic acid | 1 | 1 | 1 | 1 | 1 | 1 | 1 | 1 | 1 | 1 | 1 | 1 | 1 | 1 | 1 |
| Antimony trioxide | 5 | 5 | 5 | 5 | 5 | 5 | 5 | 5 | 5 | 5 | 5 | 5 | 5 | 5 | 5 |
| FEF carbon black | 20 | — | — | — | 30 | — | — | — | — | — | 15 | 15 | — | — | — |
| FT carbon black | — | 20 | 15 | 40 | — | 40 | 20 | 20 | 20 | 60 | — | — | 70 | — | 20 |
| MT carbon black | — | — | — | — | — | — | — | — | — | — | — | — | — | 20 | — |
| Baked clay | 60 | 20 | 75 | 75 | 60 | 40 | 60 | 60 | 60 | 30 | 90 | 15 | 80 | 60 | — |
| Baked clay | — | — | — | — | — | — | — | — | — | — | — | — | — | — | 60 |
| Total | 224.5 | 192.5 | 242.5 | 272.5 | 274 | 215.5 | 242.5 | 224.5 | 282.5 | 242.5 | 249.5 | 194.0 | 304.0 | 232.5 | 232.5 |

Examples 1 to 4 and Comparative Examples 1 to 4, 7, 8 use polychloroprene (Shoprene W® from SHOWA DENKO K.K.) as the halogen-based polymer. Example 5 and Comparative Examples 5, 6 use chlorosulfonated polyethylene (Hypalon 40® from DuPont Performance Elastomers) as the halogen-based polymer. Example 6 uses chlorinated polyethylene as the halogen-based polymer. The chlorinated polyethylene used is Tyrin® CM566 (from Dow Chemical Company, chlorination degree: 36%). Example 7 uses the above polychloroprene and chlorinated polyethylene as the halogen-based polymer.

Example 6 uses DCP and TAIC as cross linkers. Examples 1 to 4, 7 and Comparative Examples 1 to 4, 7, 8 use tetramethylthiuram monosulfide (accelerator TS) as a vulcanization accelerator. Example 5 and Comparative Examples 5, 6 use dipentamethylenethiuram tetrasulfide (accelerator TRA) and dibenzothiazolyl disulfide (accelerator DM) as vulcanization accelerators.

The aromatic-based oil used as processing aid is Diana process oil AH-16 (from Idemitsu Kosan Co., Ltd.). Further, used as antioxidants are Vulkanox® DDA (from Bayer), which is an amine-based antioxidant. Also used as one of flame retardants is antimony trioxide (PATOX-C from Nihon Seiko Co., Ltd.).

Further, Examples 1, 5 and Comparative Examples 4, 5 use FEF carbon black (from Tokai Carbon Co., Ltd., average grain size: 43 nm) as the carbon black. Examples 2 to 4, 6, 7 and Comparative Examples 1 to 3, 6, 8 use FT carbon black (Asahi Carbon Co. Ltd., average grain size: 80 nm) as the carbon black. Comparative Example 7 uses MT carbon black (Asahi Carbon Co. Ltd., average grain size: 450 nm) as the carbon black.

Examples 1 to 7 and Comparative Examples 1 to 7 use SP#33 (from Engelhard, average grain size: 1.4 μm) as the baked clay. Comparative Example 8 uses SPMA clay baked at 800° C. (from Kawamo & Co., Inc., average grain size: 2.2 μm) as the baked clay.

Table 2 shows combination ratios of compounds for forming insulations of flame retardant EP rubber insulated wires in Examples of the present invention and Comparative Examples.

TABLE 2

| Combination preparations | Combination ratio (wt %) |
|---|---|
| EPDM | 100 |
| DCP | 3 |
| Chinese white No. 3 (ZnO) | 5 |
| Amine-based antioxidant | 2 |
| Stearic acid | 1 |
| Aromatic-based oil | 5 |
| Talc | 50 |
| Bromine-based flame retardant | 20 |
| Antimony trioxide | 10 |
| FEF carbon black | 2 |
| Total | 198 |

Used as a polymer insulating material for forming the insulation of the insulated wires is ethylene-propylene-diene rubber (EPDM, EPT3045, from Mitsui Chemicals). Used as amine-based antioxidant is Vulkanox® DDA (from Bayer). Also, the aromatic-based oil used as processing aid is Diana process oil AH-16 (from Idemitsu Kosan Co., Ltd.). Further, used as talc is HI-FILLER#16 (from Tsuchiya Carolin), and used as bromine-based flame retardant is SAYTEX 8010 (from Albemarle Asano).

Manufacturing a Radiation-Proof Sheath Material Formed of the Radiation-Proof Resin Composition and a Radiation-Proof Cable Compounds for radiation-proof resin compositions in Examples and Comparative Examples are produced as follows.

First, each compound shown in Table 1 is weighed for each of Examples and Comparative Examples. Then, for each of Examples and Comparative Examples, each compound except for the cross linker (DCP, TAIC, chinese white and/or sulfur) is mixed using a No. 3 Banbury mixer resulting in first compounds (e.g., first compounds in Examples 1, 2 etc.). Subsequently, in a 50 l kneader held at approximately 60° C., the first compounds obtained are mixed with the cross linker. This results in second compounds for the radiation-proof resin composition in Examples and Comparative Examples (e.g., second compounds for radiation-proof resin composition in Examples 1, 2 etc.).

Also prepared is a flame retardant EP rubber insulated wire. The flame retardant EP rubber insulated wire is manufactured by extruding and covering on the surface of 3.5 mm$^2$-cross-section copper conductor an insulating material obtained by combination at the combination ratios shown in Table 2 (thickness of the insulating material after the covering: 2.9 mm), and then cross-linking the insulating material in approximately 190° C. high-pressure steam. The oxygen index of the insulation of the flame retardant EP rubber insulated wire is 26.0. In all of Examples and Comparative Examples, the flame retardant EP rubber insulated wire used is the same.

3 flame retardant EP rubber insulated wires are stranded resulting in a stranded insulated electric wire (core). Subsequently, using a 90 mm extruder, the manufactured compounds for radiation-proof sheath material are extruded and covered around the stranded insulated electric wire (core). Specifically, for each of Examples and Comparative Examples, the second compounds are covered around the surface of the stranded insulated electric wire (core) (e.g., the second compound for the radiation-proof resin composition in Example 1 is covered on the surface of the stranded insulated electric wire (core).)

Subsequently, approximately 190° C. pressurized steam is applied to the surface of the stranded insulated electric wire (core) covered with the second compounds for radiation-proof resin compound, to thereby cross-link the second compounds. This results in a sheath formed of radiation-proof resin composition around the stranded insulated electric wire (core), and a 17.5 mm-diameter radiation-proof cable for each of Examples and Comparative Examples.

Testing Radiation-Proof Cable Properties

Next, the radiation-proof cables obtained are tested and evaluated for each item shown below.

Test (A) Appearance: Bloom (precipitation of combination preparation in powder form on sheath surface) and bleed (leak of combination preparation in liquid form on sheath surface) are inspected visually.

Test (B) Extrusion processability: Appearance of the second compounds when extruded by using a 90 mm extruder is evaluated visually, and whether they can be extruded within a critical load is evaluated.

Test (C) Sheath material tensile test: Sheath material is separated from radiation-proof cables, followed by thickness adjustment to approximately 2 mm, and press-cutting into dumbbell No. 4 shape, and measurement at the speed of 500 mm/min with Schopper tensile tester.

Test (D) Oxygen index: Oxygen index is measured by using the second compounds in the same lot of the sheath (e.g., in Example 1, the second compound for radiation-proof resin composition that is the radiation-proof cable sheath raw material in Example 1), and fabricating 3 mm thick sheets by 180° C.×10 min press-cross-linking.

Test (E) New VTFT (Vertical Tray Flame Test): Tested in accordance with IEEE Std. 1202-1991.

Test (F) Water-resistant property: A radiation-proof cable cut into about 150 mm length (hereinafter called "cable sample") and about 500 cc of tap water are put in a pressure tight case (made from SUS3034, 70φ in inner diameter×200 in length), and the case is then sealed. Then, the case is left in a thermostatic bath at 170° C. for 24 hours and is then cooled to room temperature. Then, the cable sample is taken out of the pressure tight case, the swelling degree of the sheath of the cable sample is observed visually. Further, the cable sample is once pressed against a 700 mmφ mandrel to form a bend, is then bent in the direction opposite to the bend direction, and observed whether there is a crack. After the above test, the cable sample is comprehensively examined whether it passes the water-resistant property or not.

Test (G-1), Radiation resistance test (1) (reversed sequential test (1)): The radiation-proof cables are bundled into approximately 600 mmφ, and irradiated with 760 kGy $^{60}$Co γ rays at 4 kGy/h dose rate, followed by 121° C.×7 day thermal ageing testing, and subsequent tensile testing in the same way as in Test (C). Here, the case of the elongation being not less than 50% shows a Pass.

Test (G-2), Radiation resistance test (2) (reversed sequential test (2)): The radiation-proof cables are bundled into approximately 600 mmφ, and irradiated with 2 MGy $^{60}$Co γ rays at 4 kGy/h dose rate, followed by 140° C.×9 day thermal ageing testing, and subsequent tensile testing in the same way as in Test (C). Here, the case of the elongation being not less than 50% shows a Pass.

The elongation in Test (C), (G-1) and (G-2) is calculated as follows.

Dumbbell specimen's middle portion (Width: 5 mm, Length: 20 mm or more) is provided with predetermined length marks spaced at a constant pitch L0 (e.g., L0=20 mm). This dumbbell specimen is tensioned with the tensile tester, to break the dumbbell specimen. If the distance between marks when the dumbbell specimen is broken is L1, then elongation E0 is calculated using E0={(L1−L0)/L0}×100 (Formula 1).

Table 3 shows results of the property testing of the radiation-proof cables in Examples of the invention and Comparative Examples.

TABLE 3

| Item | | Example | | | | | | | Comparative Example | | |
|---|---|---|---|---|---|---|---|---|---|---|---|
| | | 1 | 2 | 3 | 4 | 5 | 6 | 7 | 1 | 2 | 3 |
| Appearance (bloom, bleed) | | None | None | None | None | None | None | None | None | Bleed | None |
| Extrusion processability | | Possible | Possible | Possible | Possible | Possible | Possible | Possible | Possible | Possible | Possible |
| Tensile test | Tensile strength (MPa) | 13.3 | 13.5 | 13.3 | 14.5 | 12.8 | 13.1 | 14.3 | 13.9 | 14.0 | 15.1 |
| | Elongation (%) | 560 | 580 | 530 | 490 | 590 | 540 | 620 | 490 | 650 | 380 |
| | 200% modulus | 5.3 | 5.6 | 5.5 | 6.2 | 5.1 | 5.4 | 4.6 | 5.8 | 4.3 | 6.3 |
| Oxygen index | | 34.0 | 35.5 | 33.0 | 36.5 | 33.0 | 37.5 | 34.0 | 38.0 | 26.5 | 37.0 |
| New VTFT | | Pass | Pass | Pass | Pass | Pass | Pass | Pass | Pass | Fail | Pass |
| Water-resistant property | | Pass | Pass | Pass | Pass | Pass | Pass | Pass | Pass | Pass | Fail |
| Radiation resistance (1) | Tensile strength (MPa) | 10.5 | 10.2 | 10.1 | 10.9 | 11.3 | 10.9 | 11.4 | 8.5 | 10.8 | 12.3 |
| | Elongation (%) | 60 | 80 | 60 | 70 | 210 | 200 | 90 | 30 | 85 | 70 |

TABLE 3-continued

| | | Example Comparative Example | | | | | | | | |
|---|---|---|---|---|---|---|---|---|---|---|
| (760kGy) Radiation resistance (2) (2MGy) | Tensile strength (MPa) Elongation (%) | — — | — — | — — | — — | 9.4 70 | 9.1 60 | — — | — — | — — |
| Overall evaluation | | Pass | Pass | Pass | Pass | Pass | Pass | Pass | Fail | Fail | Fail |

| | | | Example Comparative Example | | | | |
|---|---|---|---|---|---|---|---|
| | Item | | 4 | 5 | 6 | 7 | 8 |
| | Appearance (bloom, bleed) | | None | None | — | None | None |
| | Extrusion processability | | Possible | Impossible (bad appearance) | Impossible (bad appearance) | Possible | Possible |
| Tensile test | Tensile strength (MPa) | | 13.0 | Impossible to measure | Impossible to measure | 10.5 | 11.8 |
| | Elongation (%) | | 540 | | | 610 | 590 |
| | 200% modulus | | 5.1 | | | 4.4 | 4.6 |
| Oxygen index | | | 33.0 | | | 33.0 | 33.5 |
| New VTFT | | | Pass | | | Pass | Pass |
| Water-resistant property | | | Pass | | | Fail | Fail |
| Radiation resistance (1) (760kGy) | Tensile strength (MPa) Elongation (%) | | 9.1 40 | | | 9.3 50 | 9.8 50 |
| Radiation resistance (2) (2MGy) | Tensile strength (MPa) Elongation (%) | | — — | | | — — | — — |
| Overall evaluation | | | Fail | Fail | Fail | Fail | Fail |

Radiation resistance (1): 121° C. × 7 day heat treatment after γ-ray application
Radiation resistance (2): 140° C. × 9 day heat treatment after γ-ray application All of the radiation-proof cables in Examples 1 to 7 exhibit good properties in all of the tests, and pass the overall evaluation. By contrast, all of the radiation-proof cables in Comparative Examples 1 to 8 fail to pass the overall evaluation. The details are as below.

The radiation-proof cable in Comparative Example 1 is as little as 2 parts by wt in the content of aromatic-based oil and does not satisfy the radiation resistance test (1) (Test (G-1)). The radiation-proof cable in Comparative Example 2 is as much as 60 parts by wt in the content of aromatic-based oil, and it is confirmed that a bleed is generated on the surface of the radiation-proof cable in Test (A). Further, the radiation-proof cable in Comparative Example 2 is low in the flame retardancy so that it fails to pass the new VTFT.

The radiation-proof cable in Comparative Example 3 has an additive amount of the carbon black twice that of the baked clay. Namely, in Comparative Example 3, the amount of the carbon black as the reinforcing material is twice the unit amount of the amorphous inorganic material (baked clay). Thus, the radiation-proof cable in Comparative Example 3 is not suitable in the additive amount of the amorphous inorganic material so that occurrence of crack is observed in Test (F) and the cable fails to pass the water-resistant property test.

The radiation-proof cable in Comparative Example 4 is with no amine-based antioxidant added in the radiation-proof resin composition therefor. Thus, the radiation-proof cable in Comparative Example 4 is observed to be little in elongation in Test (G-1) and it fails to pass the radiation resistance test (1). The radiation-proof cable in Comparative Example 5 is as little as 30 parts by wt in the total additive amount of the FEF carbon black and the baked clay in the radiation-proof resin composition. Thus, in Comparative Example 5, the second compound for the radiation-proof resin composition is large in rubber elasticity so that the appearance of the second compound when extruded is not smooth and not good. Therefore, for Comparative Example 5, the other tests are not performed.

The radiation-proof cable in Comparative Example 6 is as much as 150 parts by wt in the total additive amount of the FT carbon black and the baked clay in the radiation-proof resin composition. Thus, in Comparative Example 6, the second compound for the radiation-proof resin composition is large in viscosity so that the extrusion is abandoned since the load of the extruder exceeds the critical point. Therefore, for Comparative Example 6, the other tests are impossible to perform.

The radiation-proof cable in Comparative Example 7 is 450 nm, more than 200 nm, in average grain size of the carbon black in the radiation-proof resin composition. Due to the large average grain size of the carbon black, Comparative Example 7 fails to pass the water-resistant property test. The radiation-proof cable in Comparative Example 8 is 2.2 μm, more than 2.0 μm, in average grain size of the baked clay in the radiation-proof resin composition. Due to the large average grain size of the baked clay, Comparative Example 8 fails to pass the water-resistant property test.

The above test results of Examples 1 to 7 demonstrate that the radiation-proof resin composition is excellent in the flame retardancy, the radiation resistance, the water-resistant property and the mechanical property, where the resin composition is obtained by adding to 100 parts by wt of the halogen-based polymer not less than 2 parts by wt of the antioxidant, not less than 5 and not more than 40 parts by wt of the aromatic-based oil, and not less than 40 and not more than 120 parts by wt of the total of the carbon black not more than 200 nm in average grain size and the baked clay not more than 2.0 μm in average grain size.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. A radiation-proof resin composition, comprising:
a polymer comprising chlorine;
a radiation resistance providing agent for providing the polymer with a radiation resistance, the radiation resistance providing agent comprising an antioxidant and a processing aid;
an amorphous inorganic material for capturing an ionic component generated in the polymer by radiation application, the amorphous inorganic material comprising a baked clay not more than 2.0 μm in an average grain size; and
a reinforcing material for reinforcing a mechanical strength of the polymer, the reinforcing material comprising a carbon black not more than 200 nm in an average grain size, an amount of the reinforcing material being not more than that of the amorphous inorganic material,
wherein the antioxidant is added to 100 parts by weight of the polymer at an amount not less than 2 parts by weight,
wherein the processing aid is added to 100 parts by weight of the polymer at an amount not less than 5 parts and not more than 40 parts by weight,
wherein the amorphous inorganic material and the reinforcing material are added to 100 parts by weight of the polymer at a total amount not less than 40 parts and not more than 120 parts by weight,
wherein the reinforcing material is added to the polymer at a rate of not less than a fifth and not more than one relative to a unit amount of the amorphous inorganic material.

2. The radiation-proof resin composition according to claim 1, wherein
the polymer comprises at least one halogen-based polymer selected from polychloroprene, chlorinated polyethylene and chlorosulfonated polyethylene.

3. A radiation-proof cable, comprising:
a plurality of conductors with an insulation formed thereon, the conductors being stranded to form a stranded wire; and
the radiation-proof resin composition according to claim 2, the radiation-proof resin composition being on a periphery of the stranded wire.

4. A radiation-proof cable, comprising:
a conductor with an insulation formed thereon; and
the radiation-proof resin composition according to claim 1, the radiation-proof resin composition being on a periphery of the conductor.

5. The radiation-proof resin composition according to claim 1, wherein the baked clay comprises a pore having a pore size greater than a size of the ionic component generated in the polymer.

* * * * *